United States Patent

Green et al.

[11] Patent Number: 5,867,522
[45] Date of Patent: Feb. 2, 1999

[54] AUTOFOCUSING SYSTEM FOR A LASER TRANSMITTER

[75] Inventors: Francisco Roberto Green; Philip Lynn Detweiler; Frank Beard Douglas, all of Tipp City, Ohio

[73] Assignee: Spectra Precision, Inc., Dayton, Ohio

[21] Appl. No.: 834,473

[22] Filed: Apr. 11, 1997

[51] Int. Cl.[6] .............................. H01S 3/08; G06K 7/10
[52] U.S. Cl. ............................. 372/99; 372/9; 372/20; 372/24; 372/25; 372/92; 372/101; 235/462; 235/454; 235/463; 235/466
[58] Field of Search .................... 372/9, 20, 24, 372/25, 26, 31, 33, 92, 99, 101; 235/462, 463, 467, 454, 455, 466

[56] References Cited

U.S. PATENT DOCUMENTS

| | | |
|---|---|---|
| 5,122,644 | 6/1992 | Hasegawa et al. ................. 235/462 |
| 5,302,812 | 4/1994 | Li et al. ................................ 235/462 |
| 5,440,111 | 8/1995 | Eastman et al. .................... 235/462 |
| 5,479,011 | 12/1995 | Rudeen et al. ..................... 250/235 |
| 5,703,351 | 12/1997 | Meyers .............................. 250/201.2 |

*Primary Examiner*—Brian Healy
*Attorney, Agent, or Firm*—Killworth, Gottman, Hagan & Schaeff, LLP

[57] ABSTRACT

An autofocusing system for a laser transmitter is provided. A laser beam is swept across a target having a plurality of sections. The target includes a first reflective section and a second reflective section with a non-reflective section positioned therebetween. A photodetector detects a signal representative of the laser beam reflected from the target. The laser beam is focused by adjusting the focusing lens until a ratio of the duration of the non-reflective portion of the signal to the sum of the durations of the reflective portions of the signal is maximized.

48 Claims, 11 Drawing Sheets

AUTOFOCUSING SYSTEM FOR A LASER TRANSMITTER

CROSS-REFERENCES TO RELATED APPLICATIONS

This application is related to commonly assigned U.S. patent application Ser. Nos.: 08/834,472, pending, POSITION LEVELING SENSOR FOR A LASER TRANSMITTER, filed Apr. 11, 1997, by Jackson et al.; Ser. No. 08/834,477, now U.S. Pat. No. 5,805,362, FOCUSING MECHANISM USING A THIN DIAPHRAGM, filed Apr. 11, 1997, by Hayes; Ser. No. 08/834,476, pending, LASER TRANSMITTER INCORPORATING TARGET DITHER, filed Apr. 11, 1997, by Green et al.; and Ser. No. 08/833,978, pending, SYSTEM FOR ADJUSTING THE ORIENTATION OF A PLANE OF LASER LIGHT, filed Apr. 11, 1997, by Detweiler et al., the disclosures of which are incorporated herein by reference.

BACKGROUND OF THE INVENTION

The present invention generally relates to the focusing of laser light emitted by a laser transmitter and, in particular, to automatic focusing of laser light emitted by a laser transmitter.

Laser systems have been employed in numerous surveying and construction applications. In one such system, a laser light transmitting device provides a rotating laser beam which establishes a reference plane. Typically, the rotating laser beam is used to define, in effect, a continuous plane of light as a constant horizontal bench mark of elevation over an entire work area. The laser light is either detected by the naked eye or by one or more laser beam detectors, placed at considerable distances from the transmitting device. Various construction tasks can be performed based on the visual perception of the laser light. The detectors are used to intercept the rotating laser beam and determine an elevation at selected points throughout the work area. Such detectors may provide a display of the beam height for an operator or, alternatively, may form part of a machine control system that controls or assists in the control of various pieces of equipment, such as for example bulldozers and motorgraders.

In the laser light transmitting device, the generally horizontal plane of light is produced by projecting the beam upward and then deflecting the beam ninety degrees within a pentaprism or penta-mirror assembly. The pentaprism assembly is rotated about a generally vertical axis within the transmitting device to cause the horizontal beam to sweep around the axis and define the horizontal plane.

A focused beam of light, that is, a beam of light having a relatively small diameter at the working distance, increases the intensity of the beam per unit area, making the laser light more readily visible to the naked eye. The required focus is dependent on the distance between the laser light transmitting device and the desired focusing location, that is, the operating distance. A focusing lens may be used to focus the light emitted by the laser light transmitting device. Manual adjustment of the focusing lens has been used in the prior art. However, manual focusing requires that one operator adjust the focusing lens at or near the transmitter while a second individual reports the effect of such adjustment on the size of the beam, some distance away. The proper focus is therefore approximated by visual perception of an individual. Manual focusing is imprecise and time consuming, especially if performed by a single user who must continually leave the work area and readjust the focus as the desired focusing location changes. It will be appreciated that manual focusing over significant distances is quite difficult.

Accordingly, there is a need for an improved focusing system for a laser transmitter, and for an improved method by which such a focusing system operates.

SUMMARY OF THE INVENTION

The present invention meets the aforementioned needs. According to a first aspect of the present invention, a process for autofocusing a rotating laser beam having a spot size comprises projecting the laser beam from a laser source such that it sweeps across a target. The target includes a plurality of reflective sections and at least one non-reflective section. The process includes detecting a reflected laser beam from the target and generating a signal having a waveform representative of the reflected laser beam. The spot size of the laser beam is then adjusted in response to the signal.

The target may be comprised of a single integral unit. The plurality of reflective sections may include a first reflective section and a second reflective section with the at least one non-reflective section positioned therebetween. The target may comprise a plurality of non-reflective sections with respective ones of the plurality of non-reflective sections alternating in position with respective ones of the plurality of reflective sections. The waveform may include a set of portions having durations corresponding to time periods during which the laser beam traverses the plurality of reflective sections. The laser beam is considered focused when a sum of the durations is less than a predetermined value. The predetermined value may be adjusted so that the sum of durations is minimized. The waveform may include a portion having a duration corresponding to a time period when the laser beam traverses the at least one non-reflective section, such that the laser beam is considered focused when the duration is greater than a predetermined value. The predetermined value may be adjusted so that the predetermined value is maximized.

According to another aspect of the invention, the waveform may include a first set of portions having durations corresponding to time periods when the laser beam traverses the plurality of reflective sections and a second portion having a duration corresponding to a time periods when the laser beam traverses the at least one non-reflective section, such that the laser beam is focused when a ratio of the second duration to a sum of the first set of durations is greater than a predetermined value. The process includes the step of determining a distance between the laser source and the target. The predetermined value corresponds to an approximate maximum of the ratio at the distance. The predetermined value may be adjusted so that the ratio is maximized.

Preferably, the laser beam is amplitude modulated. The laser beam is preferably dithered across the target. Each of the plurality of reflective sections and the at least one non-reflective section may have equal widths. The process may further include the step of determining if the reflected laser beam is a valid reflection. A valid reflection is determined by measuring a width for each of at least two of the sections of the target based on the signal, calculating a measured ratio based on the measured widths, and determining if the measured ratio corresponds to an actual ratio based on actual widths of the sections of the target. The process may include the step of determining if the target has moved. The process may further include the step of establishing predetermined gain and threshold values for detecting the reflected laser beam. The at least one of the gain and threshold value may be adjusted if the target has not been sighted for a predetermined period of time.

According to another aspect of the present invention, an autofocusing system for focusing a rotating laser beam from a laser source comprises a target having a plurality of reflective sections and at least one non-reflective section. The laser beam is swept across the target forming a reflected laser beam. A focusing lens is positioned between the laser source and the target and adapted to control a spot size of the laser beam on the target. A photodetecting system generates a signal having a waveform representative of the reflected laser beam. A processor is adapted to receive the signal and programmed to control the focusing lens based on the signal.

The target may be comprised of a single integral unit. The plurality of reflective sections may includes a first reflective section and a second reflective section with the at least one non-reflective section positioned therebetween. The target may comprise a plurality of non-reflective sections with respective ones of the plurality of non-reflective sections alternating in position with respective ones of the plurality of reflective sections. The waveform may include a set of portions having durations corresponding to time periods when the laser beam traverses the plurality of reflective sections, such that the laser beam is focused when a sum of the durations is less than a predetermined value. The predetermined may be adjusted by the processor so that the sum of the durations is minimized. The waveform may include a portion having a duration corresponding to a time period when the laser beam traverses the at least one non-reflective section, such that the laser beam is focused when the duration is greater than a predetermined value. The processor may adjust the predetermined value so that the duration is maximized.

According to another aspect of the invention, the waveform may include a first set of portions having durations corresponding to time periods when the laser beam traverses the plurality of reflective sections and a second portion having a duration corresponding to a time period when the laser beam traverses the at least one non-reflective section, such that the laser beam is focused when a ratio of the second duration to a sum of the first set of durations is greater than a predetermined value. The processor is further programmed to calculate a distance between the laser source and the target. Preferably, the processor is further programmed to set the predetermined value corresponding to an approximate maximum of the ratio at the distance. The processor may adjust the predetermined values so that the ratio is maximized.

The laser beam is preferably amplitude modulated. Preferably, the laser beam is dithered across the target. Each of the plurality of reflective sections and the at least one non-reflective section may have equal widths. The processor is further programmed to determine if the reflected laser beam is a valid reflection. The processor may be programmed to determine a measured width for each of at least two of the sections of the target based on the signal, calculate a measured ratio based on the measured widths, and determine if the measured ratio corresponds to an actual ratio based on actual widths of the sections of the target in order to validate the reflected laser beam. Preferably, the processor is further programmed to determine if the target has moved. The processor may be further programmed to establish predetermined gain and threshold values for detecting the reflected laser beam. The processor may be programmed even further to adjust at least one of the gain or threshold values if the target has not been detected for a predetermined period of time.

Other objects and advantages of the invention will be apparent from the following description, the accompanying drawings and the appended claims.

DETAILED DESCRIPTION OF THE INVENTION

Figure 1:
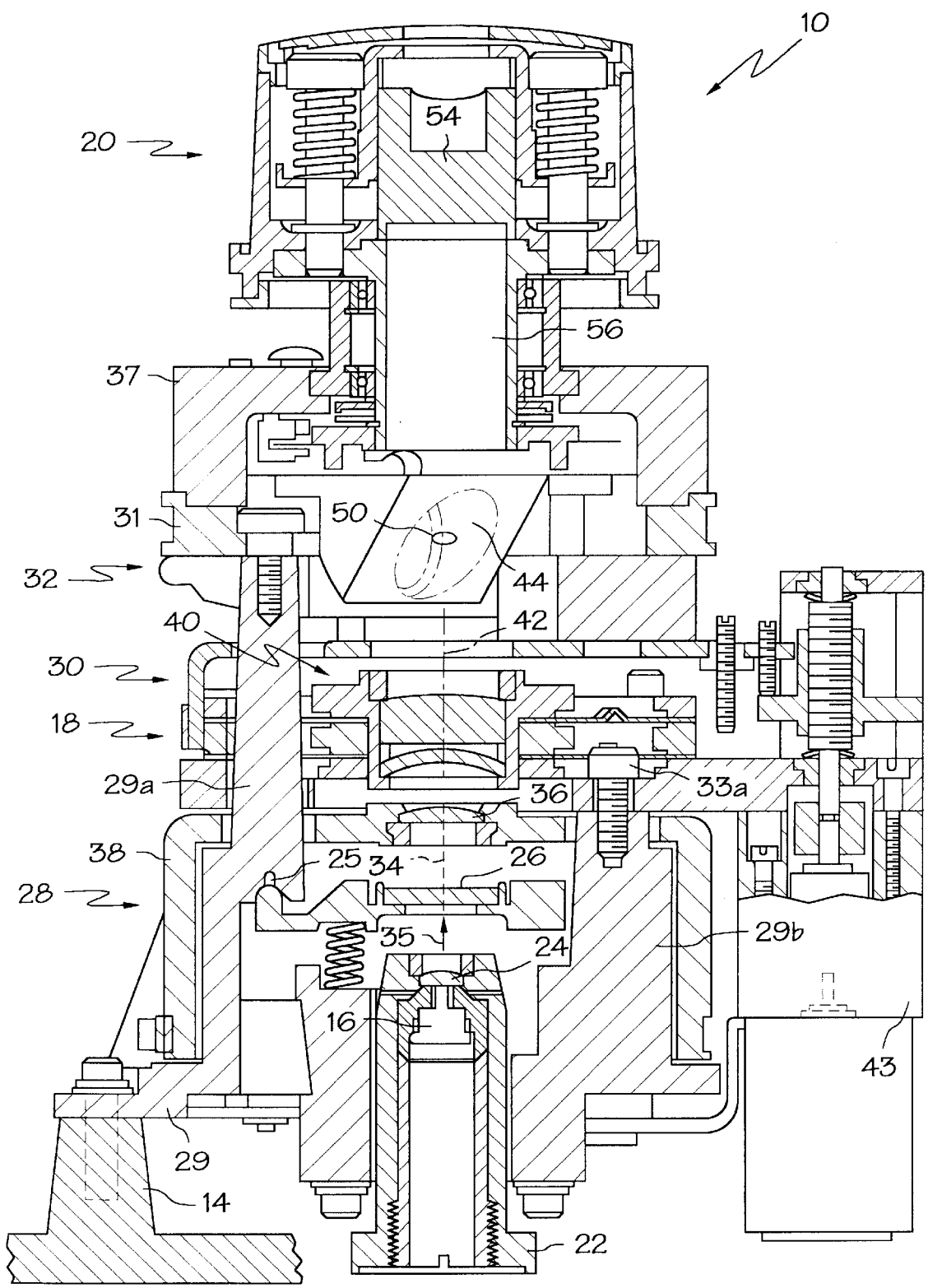
FIG. 1 is a cross-sectional view of a laser transmitter according to the present invention.
Figure 2:
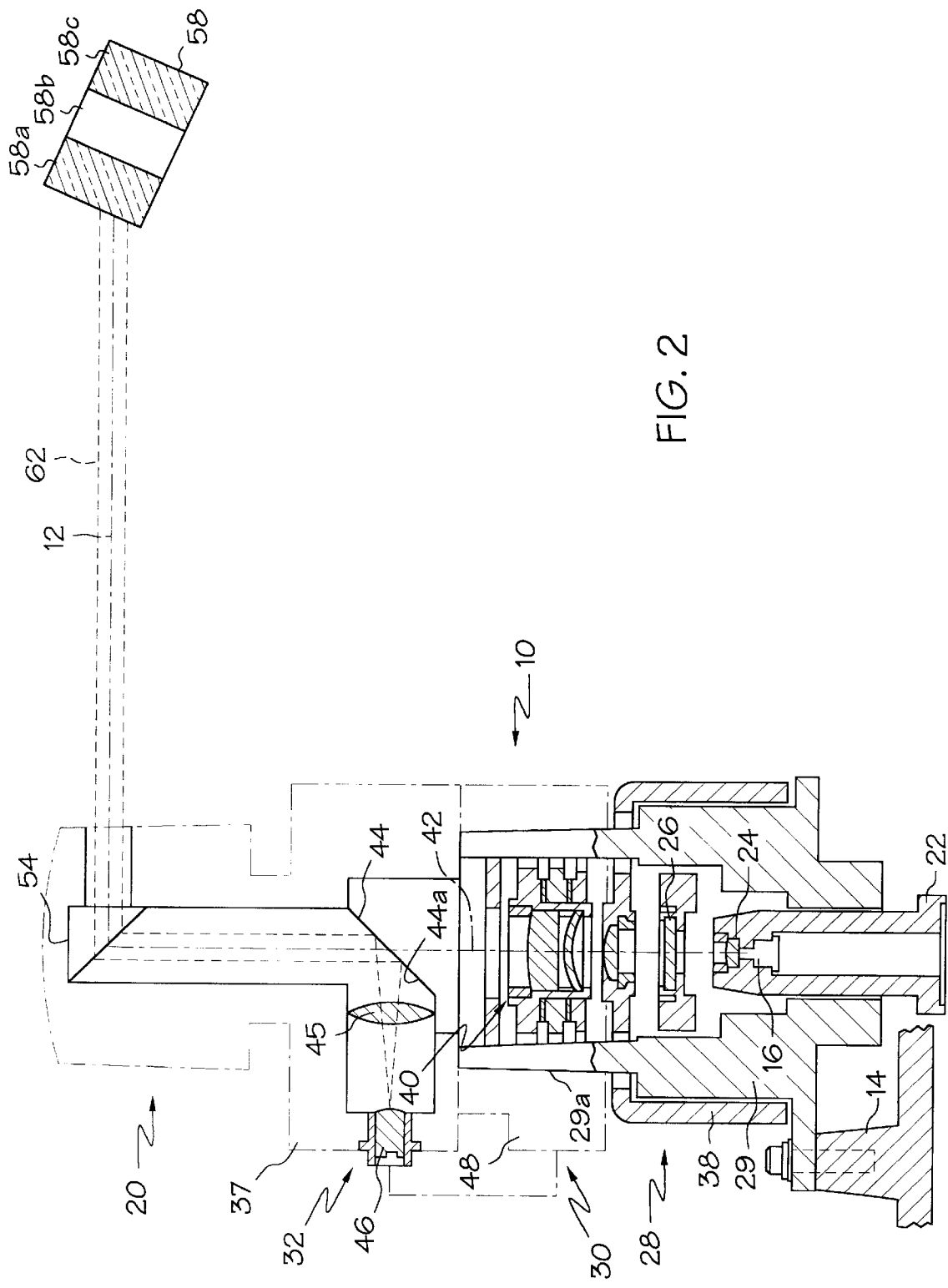
FIG. 2 is a schematic view of the laser transmitter of FIG. 1.

Referring now to FIGS. 1 and 2, a laser transmitter 10 for transmitting a beam of laser light 12 is shown. The laser transmitter 10 includes a housing 14, a light source 16, an optical assembly 18 and an optical projecting device 20. The light source 16 is coupled to an assembly 22. According to the illustrated embodiment, the light source 16 is a laser diode which generates the beam of laser light 12. The assembly 22 includes a collection lens 24 that is positioned above the light source 16. The collection lens 24 serves to collect the laser beam 12 and project it in a first direction 35. Preferably, the collection lens 24 is a planar convex lens which collimates the laser beam 12.

The optical assembly 18 includes a flat window 26, a compensator assembly 28, a focusing mechanism 30 and a photodetecting system 32. The compensator assembly 28 includes an optics frame 29, a compensator cup 38 and a wire clamp ring 31. The optics frame 29 is coupled to and supported by the housing 14. The assembly 22 is coupled to the optics frame 29. The flat window 26 is positioned above the collection lens 24, and is pivotally coupled to the optics frame 29 through a spherical pivot 25. The flat window 26 tilts along an X-axis and a Y-axis using two calibration screws (not shown). The position of the flat window 26 is finely adjusted by the calibration screws so that the laser beam 12 is projected along substantially vertical axis or first axis 34. The laser beam 12 will therefore be plumb when the optics frame 29 is positioned along a plane which is substantially parallel with respect to the plane of the ground, i.e. substantially level. A plumb beam of light is light which is projected substantially vertically with respect to the ground. The laser beam 12 is projected in the first direction 35 by the light source 16 and the collection lens 24 and made plumb along the first axis 34 through the flat window 26. It should be apparent that the laser beam 12 will be plumb as long as the optics frame 29 is substantially level with respect to the ground.

The compensator assembly 28 optically adjusts the position of the laser beam 12 so that it is plumb even when the optics frame 29 is not substantially level. The compensator assembly 28 includes a compensating lens 36 mounted in the center of the compensator cup 38. The compensator cup 38 is positioned above the flat window 26 and swings freely on three wires (not shown) which are attached to the wire clamp ring 31. The wire clamp ring 31 is coupled to the optics frame 29 through three posts (only one post 29a shown). The compensator cup 38 is free to move when the compensator cup 38 is level within 12 minutes. As long as the compensator cup 38 is within 12 minutes of level, the compensating lens 36 may translate along the X and Y axes and optically adjust the position of the laser beam 12 so that it is plumb as it emerges from the compensator cup 38. The housing 14 is provided within an automatic or manual leveling device (not shown) to place the compensator assembly 28 within 12 minutes of level. The compensator cup 38 is suspended from the wire clamp ring 31 which is coupled to the optics frame 29 of the compensator assembly 28, so that once the compensator assembly 28 is within 12 minutes of level, the compensator cup 38 is also within 12 minutes of level. The compensator lens 36 may then optically adjust the position of the laser beam 12 so that it is plumb as it emerges from the compensator cup 38. The compensator assembly 28 therefore compensates optically for misalignments of the optics frame 29 which are within 12 minutes of level. It should be apparent that the flat window 26 and the compensator assembly 28 function to project the laser beam 12 along the first axis 34, either singularly or in tandem.

The focusing mechanism 30 is positioned above the compensator cup 38 and is coupled to the optics frame 29 through three small posts (only one small post 29b shown) by three fasteners (only one fastener 33 shown). The three posts 29a of the optics frame 29 pass through the focusing mechanism 30 so that the focusing mechanism 30 does not contact the compensator cup 38. The focusing mechanism 30 includes a focusing lens 40 which is translated along the first axis 34 to adjust the focus of the laser beam 12. The focusing mechanism 30 is positioned so that the first axis 34 coincides with an optical axis 42 of the focusing lens 40. A plumb beam of laser light 12 is focused by the focusing mechanism 30. The focusing mechanism 30 includes a focus motor 43 coupled to the focusing lens 40. The focus motor 43 is adapted to change the position of the focusing lens 40 thereby adjusting the focus of the laser beam 12. The focusing mechanism 30 is described in detail in copending application, U.S. Ser. No. 08/834,477 now U.S. Pat. No. 5,805,362, FOCUSING MECHANISM USING A THIN DIAPHRAGM, filed Apr. 11, 1997, by Hayes, herein incorporated by reference.

The wire clamp ring 31 is positioned above the focusing mechanism 30. The wire clamp ring 31 is the upper most portion of the compensator assembly 28. The wire clamp ring 31 includes the three wires (not shown) for suspending the compensator cup 38. All of the optical components are coupled to either the optics frame 29 or the wire clamp ring 31. Consequently, the compensator assembly 28 is the main frame of reference for the laser transmitter 10.

The photodetecting system 32 is coupled to the optics frame 29 and is positioned above the focusing mechanism 30. As shown in FIG. 2, the photodetecting system 32 includes a reflector 44, a lens 45, a photodetector 46 and a detector circuit 48. The reflector 44 includes an aperture 50 positioned along optical axis 42. The aperture 50 is sized to pass the laser beam 12. The reflector 44 also includes a reflective surface 44a to reflect returned light to the photodetector 46.

Referring to FIGS. 1 and 2, the optical projecting device 20 is coupled to the wire clamp ring 31 through a mounting ring 37. The optical projecting device includes a motor (not shown) and a pentaprism 54 within a spindle 56. The optical projecting device 20 is positioned above the focusing mechanism 30 to deflect the laser beam 12 ninety degrees with respect to vertical. The pentaprism 54 is a structure which deflects incoming light at a ninety degree angle with respect to the vertical regardless of the incident angle of the light on the pentaprism 54. Consequently, the incoming light does not have to hit the pentaprism 54 at an exact location in order to be deflected ninety degrees. The pentaprism 54 is rotated within the spindle 56 by the motor at a speed of approximately 50 rpm to define a substantially horizontal plane of light. A speed of 50 rpm is well suited for visible perception of the laser light 12 by the user. However, as will be appreciated by those skilled in the art, the pentaprism 54 may be rotated at any reasonable speed without departing from the scope of the present invention. While a pentaprism is used in the illustrated embodiment to deflect the incoming light, other light deflecting devices, such as a pentamirror, mirror, prism, reflector or refractor may also be used.

Figure 3:
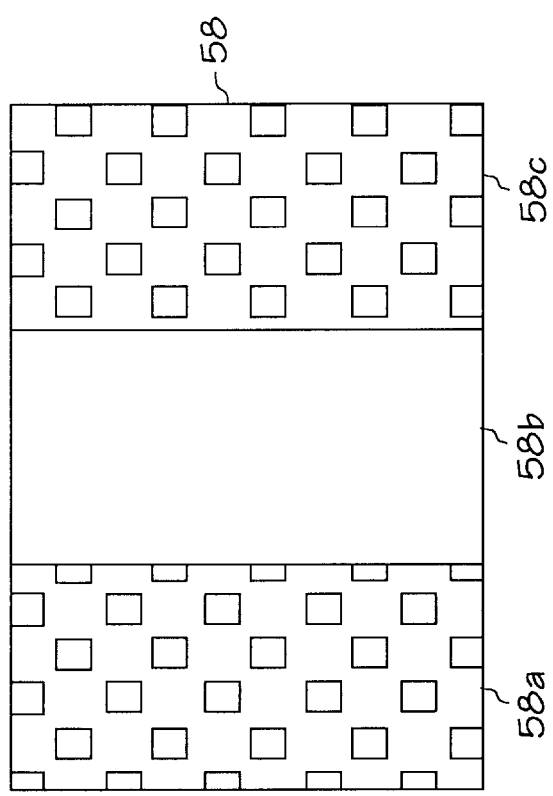
FIG. 3 is a front view of a target according to the present invention.

Referring now to FIGS. 2 and 3, a target 58 is placed at the desired focusing location. According to the illustrated embodiment as shown in FIG. 3, the target 58 comprises three equal width sections, 58a, 58b, 58c. The target 58 includes a first reflective section 58a, a second reflective section 58c, and a non-reflective section 58b. In the illustrated embodiment, the first and second reflective sections 58a, 58c are composed of reflective materials while the non-reflective section 58b is composed of a non-reflective material. It will be appreciated by those skilled in the art that the target 58 may comprise more than three total sections. It will be further appreciated by those skilled in the art that the sections may have different widths.

It should be apparent that the target 58 should be comprised of alternating reflective and non-reflective sections with at least two reflective sections and at least one non-reflective section positioned therebetween. The laser beam 12 is focused by detecting the light reflected from the target 58. The photodetecting system 32 is designed to detect light which is reflected from the reflective sections 58a, 58c of the target 58 such that the first and last sections should be reflective. It will be appreciated by those skilled in the art that if the first and/or last section is non-reflective, such non-reflective sections would be irrelevant for the purposes of autofocusing as the photodetecting system 32 would not be able to distinguish the first or last non-reflective section from the surrounding environment. The photodetecting system 32 is only able to detect a non-reflective section if the non-reflective section is surrounded by reflective sections. In the illustrated embodiment, the target 58 is comprised of a single integral unit including sections 58a, 58b and 58c. However, the target 58 may be comprised of discrete first and third reflective sections 58a and 58c coupled together with an empty space between them representing the non-reflective second section 58b. Further, the target 58 may comprise separate and distinct sections 58a, 58b and 58c which are positioned a set distance from each other, or separate and distinct reflective sections 58a, 58c separated a set distance from each other.

Figure 6:
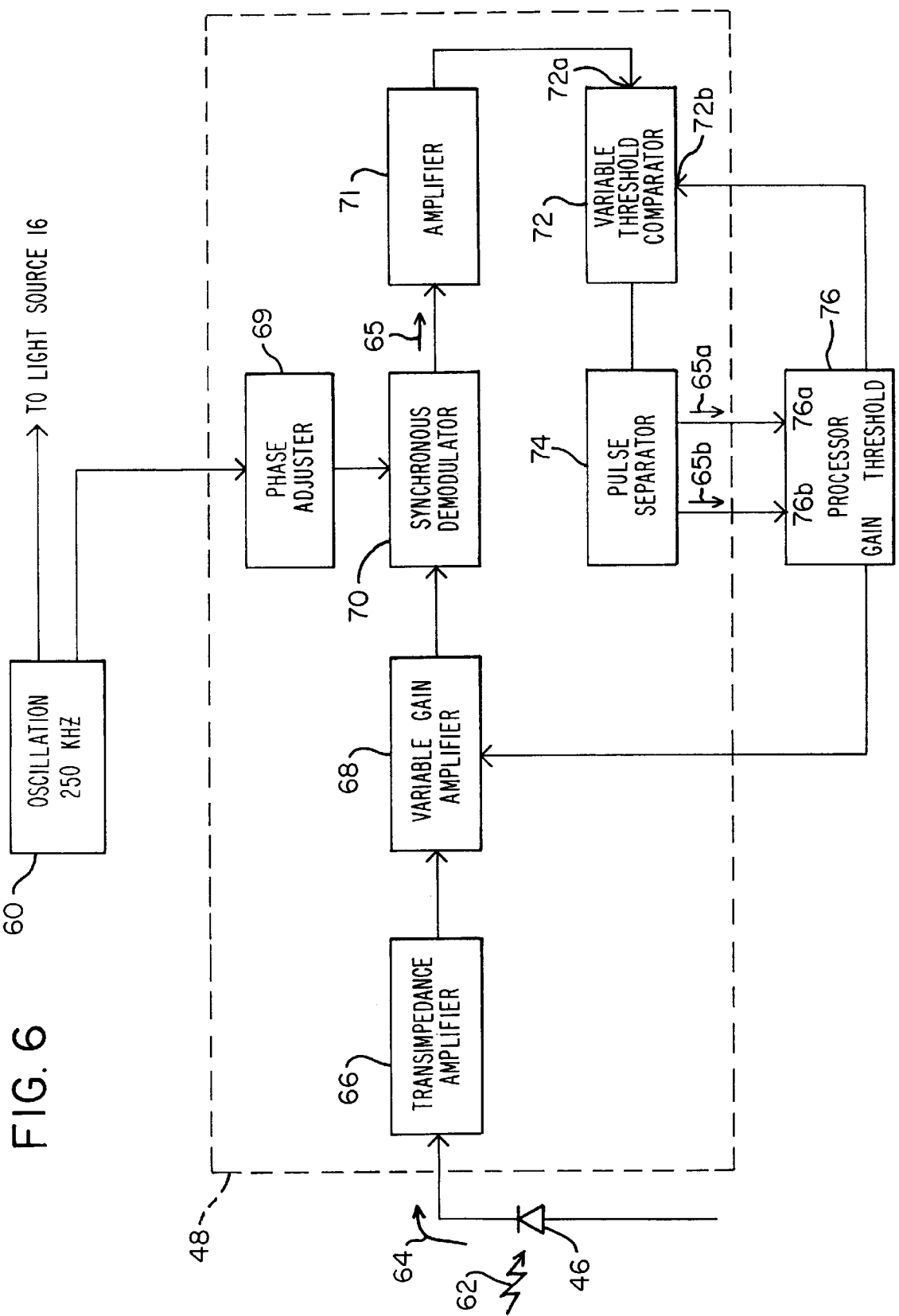
FIG. 6 is a schematic diagram of a detector circuit of the laser transmitter of FIG. 1.

During autofocusing, the laser beam 12 is modulated by an oscillator 60 which supplies power to the light source 16, as shown in FIG. 6. The laser beam 12 is modulated to distinguish the laser beam 12 from other light sources, such as any of the numerous other ambient light sources. Preferably, the oscillator 60 generates a 250 KHz carrier oscillation signal. It will be appreciated by those skilled in the art that other frequencies may be used to modulate the laser beam 12. It should be further appreciated by those skilled in the art that the laser beam 12 may be transmitted without any modulation. As shown in FIG. 2, the modulated laser beam 12 is swept across the target 58. A reflected beam of laser light 62 is reflected back towards the laser transmitter 10. For clarity and ease of description, the reflected beam of laser light 62 has been given a separate designation from the laser beam 12 even though they are the same beam. The reflected beam of laser light 62 consists of two pulses of light each time the laser light 12 is reflected from the first and second reflective sections 58a, 58c of the target 58. The reflected light 62 is received by the pentaprism 54 and reflected towards the reflector 44. The reflected light 62 is then reflected by the reflective surface 44a of reflector 44 and focused by the lens 45 onto the photodetector 46.

Figure 4:
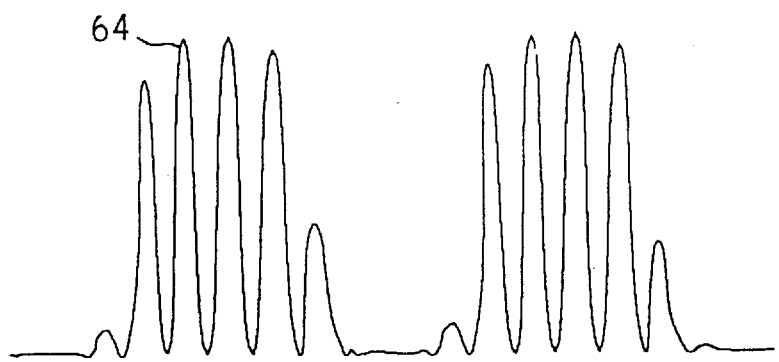
FIG. 4 is a waveform representative of modulated light reflected from the target of FIG. 3.

As shown in FIG. 4, the photodetector 46 generates a signal 64 having a waveform representative of the reflected light 62. In the illustrated embodiment, the photodetector 46 is a PIN diode such that the signal 64 is in current form. The waveform comprises two pulses representative of the time periods in which the laser light 12 sweeps across the first and second reflective sections 58a, 58c of the target 58. The signal 64 is basically an amplitude modulated signal with a data signal portion 65 and the 250 Khz carrier oscillation signal portion 67 (see FIGS. 5a and 5b). The signal 64 is transmitted to the detector circuit 48 as part of the autofocusing routine.

Referring to FIG. 6, the detector circuit 48 includes a transimpedance amplifier 66, a variable gain amplifier 68, a phase adjuster 69, a synchronous demodulator 70, an amplifier 71, a variable threshold comparator 72 and a pulse separator 74. The photodetector 46 is coupled to the transimpedance amplifier 66. The transimpedance amplifier 66 converts the current form of the signal 64 generated by the photodetector 46 to a voltage form of the signal 64. The voltage form of the signal 64 is transmitted to the variable gain amplifier 68. In the illustrated embodiment, the variable gain amplifier 68 has a low gain mode and a high gain mode. The low gain mode is used when the target 58 is close to the laser transmitter 10 since more light is reflected back. The high gain mode is used when the target is far from the laser transmitter 10 since less light is reflected back. The variable gain helps prevent the detector circuit 48 from saturating when an excessive amount of light is reflected back to the laser transmitter 10. It will be appreciated by those skilled in the art that the transimpedance amplifier 66 could be a variable gain transimpedance amplifier. It will be fully appreciated by those skilled in the art that the detector circuit 48 could be prevented from going into saturation by using a conventional clipping circuit.

Figure 5A:
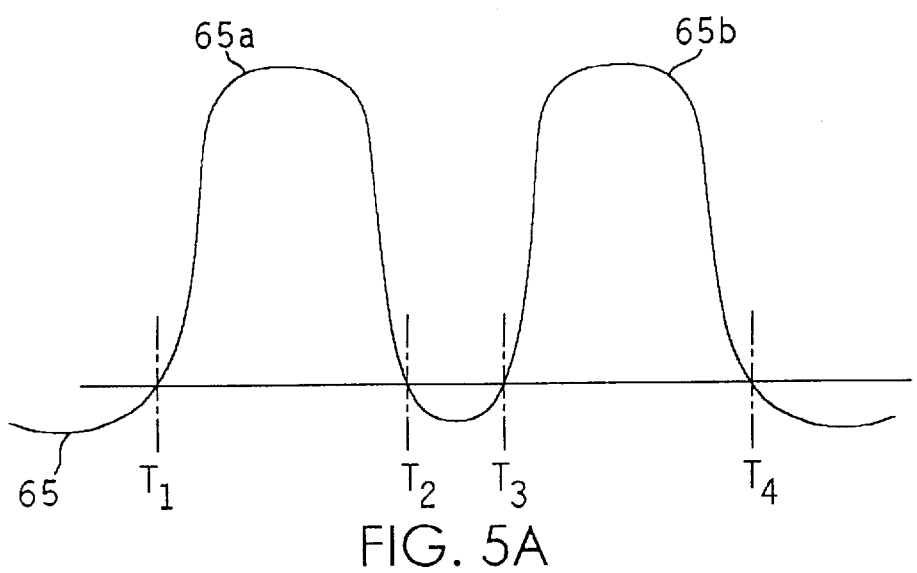
FIG. 5A is a waveform of a data signal portion of the waveform of FIG. 4.
Figure 5B:
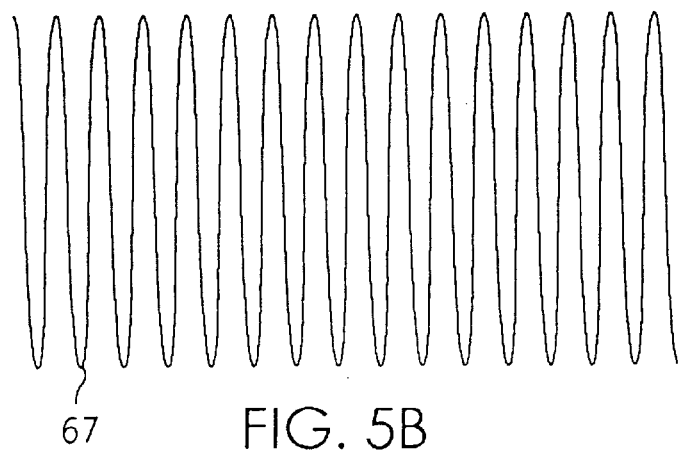
FIG. 5B is a waveform of a carrier oscillation portion of the waveform of FIG. 4.

The phase adjuster 69 receives the carrier oscillation signal which was used to modulate the laser beam 12. The phase adjuster 69 adjusts the phase of the carrier oscillation signal to match the phase of the signal 64. The adjusted oscillation signal is fed to the synchronous demodulator 70 along with the signal 64 from the variable gain amplifier 68. The synchronous demodulator 70 separates the carrier oscillation signal portion 67 from the data signal portion 65. As shown in FIG. 5a, the data signal portion 65 comprises a first pulse 65a and a second pulse 65b. The synchronous demodulator 70 outputs the data signal portion 65 which is then amplified by the amplifier 71.

The amplified data signal portion 65 is inputted into a first input 72a of the variable threshold comparator 72. A second input 72b of the variable threshold comparator 72 receives a threshold voltage which sets the threshold capability of the variable threshold comparator 72. A threshold voltage is used to filter out background noise that may be detected by the photodetector 46. The variable threshold comparator 72 outputs the portions of the amplified data signal portion 65 which exceed the voltage threshold as established by the second input 72b. As the laser beam 12 is swept across the reflective sections 58a, 58c, the data signal pulses 65a, 65b extracted by the detection circuit 48 should exceed the threshold voltage.

The threshold voltage may be adjusted based on the approximate distance between the target 58 and the laser transmitter 10. A lower threshold voltage may be set when a relatively weak signal is received while a higher threshold voltage may be set when a relatively strong signal is received. A stronger signal will be generated as the target 58 is moved closer to the laser transmitter 10.

The amplified data signal portion 65 outputted from the variable threshold comparator 72 is inputted into the pulse separator 74. The pulse separator 74 separates the two pulses 65a, 65b into separate component pulses, i.e. the first pulse 65a and the second pulse 65b. The first pulse 65a is transmitted to a first timer input 76a of a processor 76 while the second pulse 65b is transmitted to a second timer input 76b of the processor 76. The processor 76 includes an internal clock and an edge detector which establish the time interval in which a transition is made by each pulse 65a, 65b. As shown in FIG. 5A, the first transition is set as $T_1$, the second transition is set as $T_2$, the third transition is set as $T_3$ and the fourth transition is set as $T_4$.

The first time period, $T_2-T_1$, represents the duration of time in which the laser beam 12 sweeps across the first reflective section 58a of the target 58. The second time period or deadband period, $T_3-T_2$, represents the duration of time in which the laser beam 12 sweeps across the non-reflective section 58b of the target 58. The third time period, $T_4-T_3$, represents the duration of time in which the laser beam 12 sweeps across the second reflective section 58c of the target 58. The laser beam 12 is focused by adjusting the durations of the three time periods.

For example, if the target sections 58a, 58b and 58c have equal widths and if the laser beam 12 were dimensionless, then a ratio of the deadband period to the sum of the first and third time periods should equal 0.5. However, the laser beam 12 is not dimensionless but is generally circular in cross-section, having a finite diameter. As the laser beam 12 becomes out of focus, the diameter of the beam of laser light 12 increases. A larger spot of light on the target 58 will take longer to sweep completely across the reflective sections 58a, 58c of the target 58 than will a smaller spot of light. Therefore, as the diameter of the beam of laser light increases the first and third time periods will increase and the deadband period will decrease. Accordingly, the ratio will decrease with increasing spot size. By focused, we mean reducing the beam in diameter to a minimum at the distance defined by the target 58. It will be appreciated that, due to a number of factors, including the nature of a laser beam produced by the light source 16, the rays initially making up the beam are not precisely parallel, and there is a limit to the minimum beam diameter that can be produced.

The laser beam 12 may be focused by maximizing the ratio. The ratio is maximized by adjusting the focusing lens 40 until the ratio at least exceeds a predetermined value. The predetermined value is determined by the processor 78 based on a estimated distance between the target 58 and the laser transmitter 10. The distance may be estimated based on the total duration of the three time periods since the total duration is inversely proportional to the distance, i.e. shorter for longer distances and longer for shorter distances. The processor 78 includes a data table which sets the gain of the variable gain amplifier 66, the voltage threshold of the variable threshold comparator 72 and the predetermined value based on the estimated distance. The data table is developed based on the target width and is accessed by the autofocusing routine. The position of the focusing lens 40 is changed until the ratio at least exceeds the predetermined value. The laser beam 12 is focused once the ratio is maximized for the given distance between the target 58 and the laser transmitter 10.

Calculating the ratio of the time periods as described above is beneficial for many reasons. First of all, it reduces the effect associated with varying rotor speed of the pentaprism 54. Secondly, it reduces the effect associated with changes in the distance between the laser transmitter 10 and the target 58. Thirdly, there is a doubling effect for changes in spot size since a change in the duration of the deadband portion yields a corresponding change in the duration of the first and third portions. Finally, it eliminates the effect associated with the velocity of the laser beam 12 as it is swept across the target 58.

Other schemes may be used to focus the laser beam 12. For example, the laser beam 12 may be focused by maximizing the duration of the deadband portion or by minimizing the duration of the first and second portions. The deadband period is maximized when the deadband period at least exceeds a predetermined value while the sum of the first and third periods are minimized when the sum is at least less than a predetermined value. A data table of predetermined values may be developed for either scenario based on the estimated distance between the target 58 and the laser transmitter 10 as described above.

Further, the predetermined values above may be running variables which change as the autofocusing routine is running. By changing the predetermined values, the ratio or durations may be maximized or minimized, as appropriate, so that the maximum ratio, or the maximum or minimum duration is obtained. For example, it is not possible to predict the exact ratio at which the laser beam 12 is perfectly to near perfectly focused. The measured ratio values are bracketed as the laser light 12 is focused to points before and after perfect to near perfect focus with the predetermined value being the largest measured ratio during a particular autofocusing routine. The predetermined value may therefore change so that the resulting ratio is maximized to focus the laser beam 12. Similarly, when the duration of the deadband period is used to focus the laser beam 12, the predetermined value is the largest measured deadband period during a particular autofocusing routine. When the duration of the first and third portions is used to focus the laser beam 12, the predetermined value is the smallest measured duration during a particular autofocusing routine. Therefore, the respective duration is either maximized or minimized in order to focus the laser beam 12.

The length of time it takes to focus the laser beam 12 is directly proportional to the rate at which the laser beam 12 is swept across the target 58. The rate may be increased by dithering the laser beam 12 across the target 58. The laser beam 12 is dithered by sweeping the laser beam 12 back and forth across the target 58 once the target 58 is detected, reversing the direction of the beam rotation after each sweep. More data is transmitted to the photodetecting system 32 by this technique since the laser beam 12 does not have to rotate a full 360 degrees. The amount of data transmitted to the photodetecting system 32 increases without having to increase the rotational speed of the pentaprism 54. However, it will be appreciated by those skilled in the art that the rotational speed of the pentaprism 54 may be reasonably increased to reduce focusing time, as well.

Figure 7:
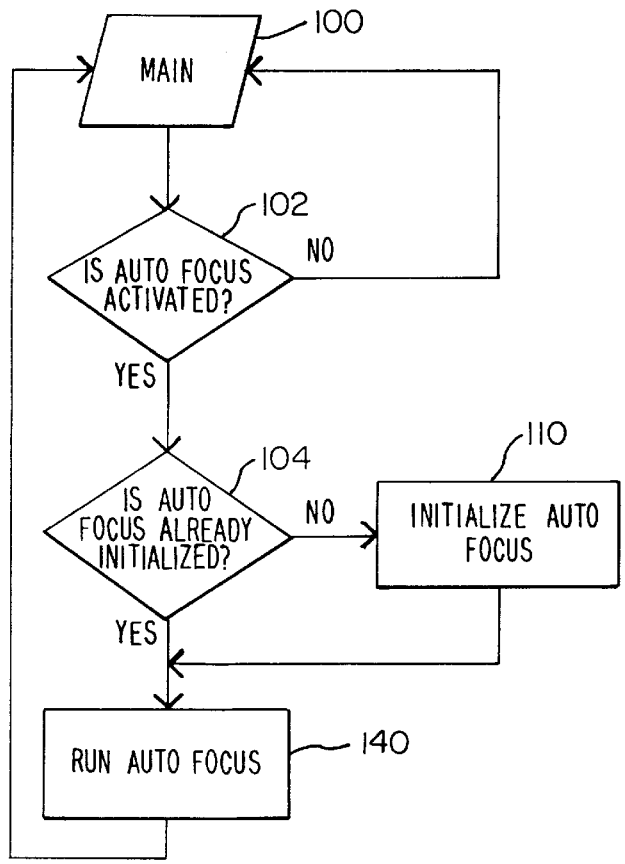
FIGS. 7–14 are flow charts of an autofocusing routine of the present invention.

Referring to the flow charts of FIGS. 7–14, the autofocusing routine will be described in detail. The main control routine for the laser transmitter 10 is shown in FIG. 7. The main routine 100 controls the laser transmitter 10 during normal operation until the autofocus mode is activated. Block 102 is a decision block which monitors the main routine 100 for autofocus activation. If autofocusing is not activated, the program returns to the main routine 100. If autofocusing is activated, the program determines if autofocusing is already initialized in decision block 104. If the autofocusing is not already initialized, the program executes the initialize autofocus subroutine 110. If autofocusing is already initialized, the autofocus subroutine 140 is executed. Similarly, once the initialize autofocus subroutine 110 is executed, the autofocus subroutine 140 is executed. After the autofocus subroutine 140 is executed, the program returns to the main routine 100 for normal laser operation if the autofocus mode is deactivated or autofocusing is continued if the autofocus mode is still activated.

Figure 8:
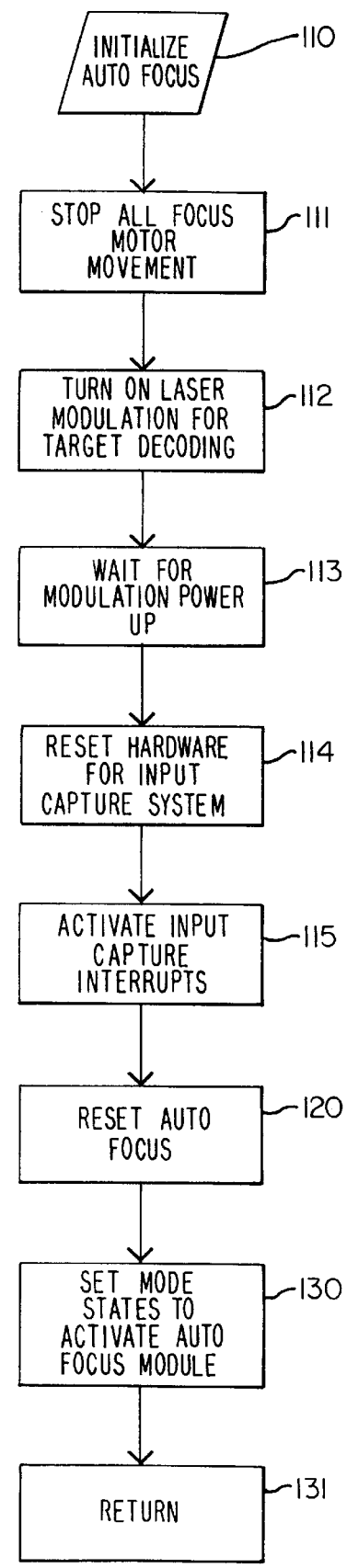

The initialize autofocus routine 110 is shown in FIG. 8. The program stops the focus motor 43 in block 111. The focus motor 43 is part of the focusing mechanism 30 and is used to move the focusing lens 40 along its optical axis 42. The oscillator 60 is activated in block 112 to modulate the laser beam 12. The next block 113 waits for the oscillator 60 to power up. Once the oscillator 60 is fully powered, the hardware is reset in block 114 and the input capture interrupts are activated in block 115 so that light may be detected by the photodetecting system 32. The pulse separator 74 includes a flip-flop which must be reset before signals from the target 58 may be captured. Block 114 performs a hardware operation by pulsing a control line low so that the flip-flop may be reset. A software reset is performed by block 115. Block 115 enables the program interrupts so that the data pulses may be tracked. The processor 76 may now expect data from the photodetecting system 32.

The program now executes the reset autofocus subroutine 120 which initializes the variables of the autofocusing routine. Once the reset autofocus subroutine 120 is executed, the program sets mode states to activate the autofocus subroutine 140 in block 130. Block 130 enables the system to start the autofocus subroutine 140. There are a number of different modules which may be executed by the processor 76. Block 130 activates one such module so as not to overload the processor 76. Block 131 returns the program to the routine or subroutine which called the initialize autofocus subroutine 110.

Figure 9:
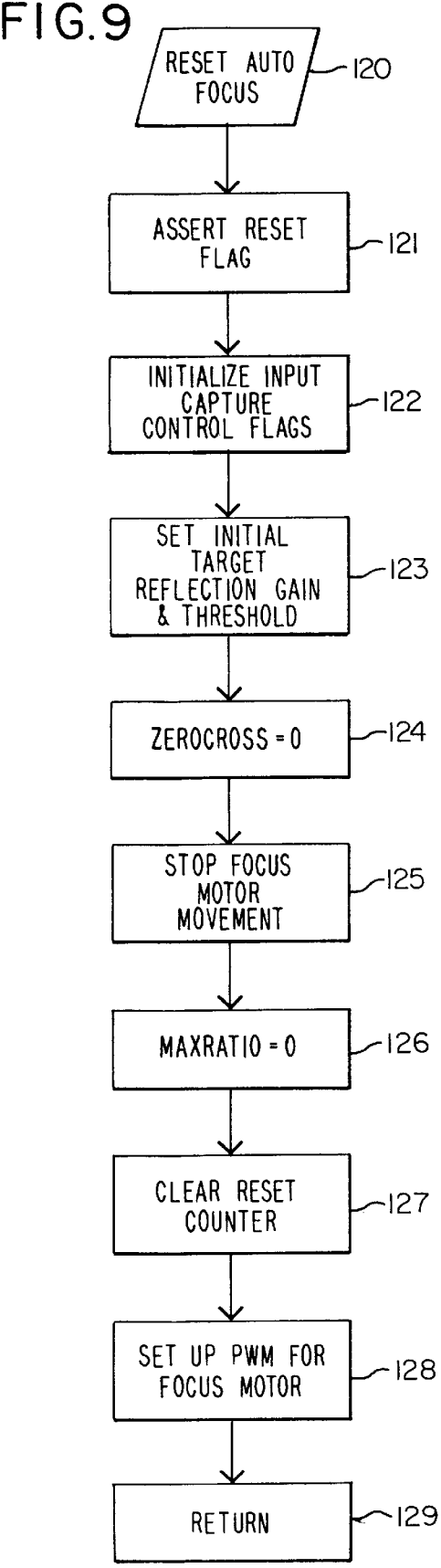

The reset autofocus subroutine 120 is shown in FIG. 9. In block 121, the reset flag is asserted. The reset flag is asserted for three scenarios. The first scenario is when the autofocusing routine is initialized. The second and third scenarios are related in that the reset flag is asserted if the target moves or disappears. Once the reset flag is asserted, the system reset subroutine will be executed at the appropriate block. The reset flag is asserted during the reset autofocus subroutine 120 so that an initial distance measurement may be made. The input capture control flags are initialized/reset in block 122. The input capture interrupts are activated in block 115 to clear the timers and the flags associated with the hardware interrupts. The initial voltage gain and voltage threshold is set in block 123 which is basically the default voltage gain and voltage threshold programmed into the processor 76. The program will also adjust the gain and/or threshold of the detector circuit 48 if the target 58 has not been detected for a predetermined period of time in order to change the sensitivity of the detector circuit 48. The program expects to detect the target 58 when in autofocusing mode so that the gain and/or threshold is adjusted to increase the sensitively of the detector circuit 48 and the likelihood of detecting the target 58. The gain and/or threshold may be adjusted at any desired rate, i.e. after each revolution of the pentaprism 54. The zerocross variable is set to zero in block 124. The focus motor 43 is stopped in block 125. The MaxRatio is set to zero in block 126. The reset counter is cleared in block 127. The pulse width modulator (PWM) is set up for the focus motor 43 in block 128. Pulse width modulation is used to control the operation of the focus motor 43. Block 129 returns the program to the routine or subroutine which called the reset autofocus subroutine 120.

Figure 10:
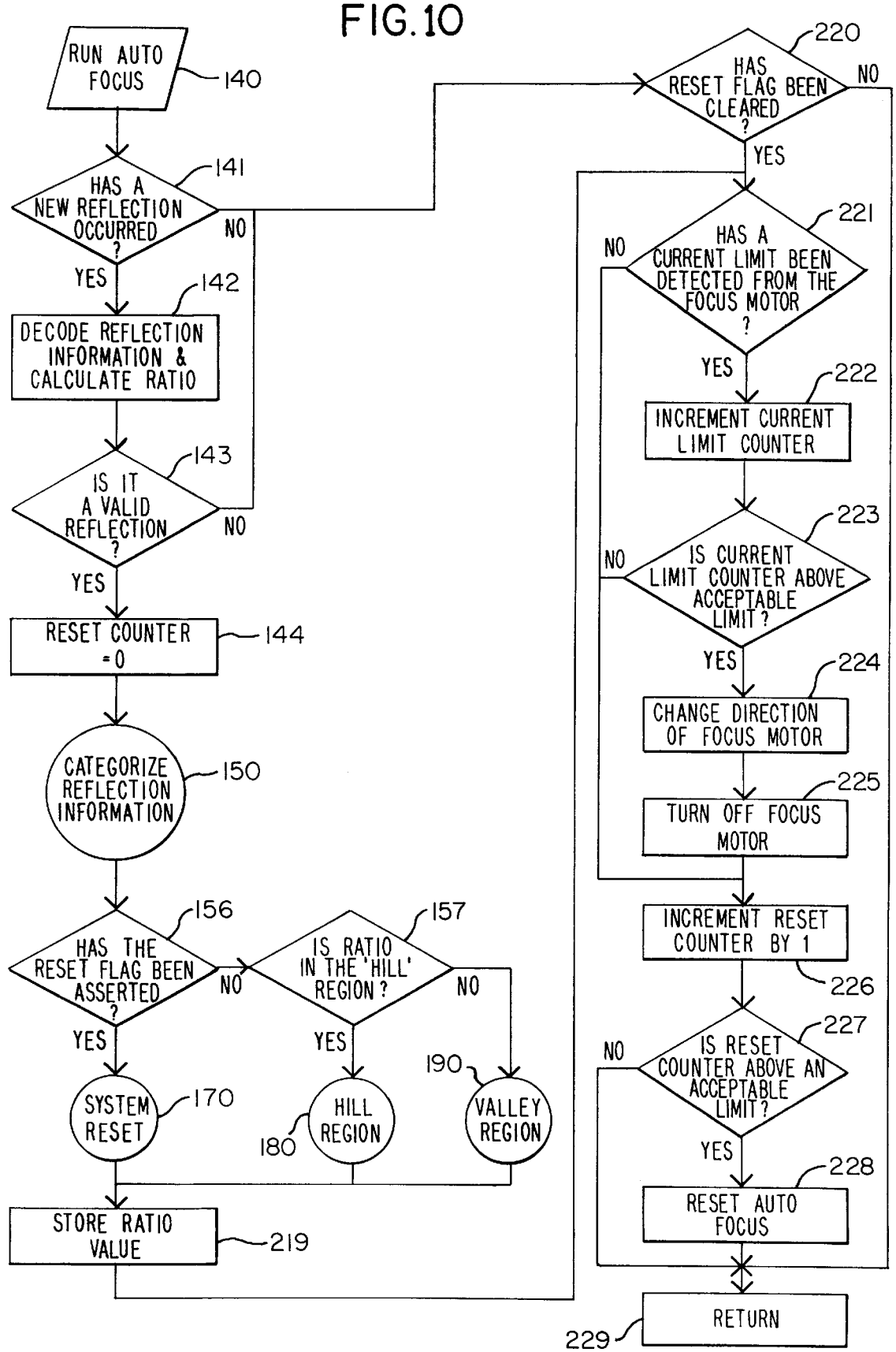

The run autofocus subroutine 140 is shown in FIG. 10. The program determines if a new reflection has occurred in decision block 141. A new reflection has occurred if the input interrupts are triggered. A new reflection requires four interrupts to be triggered. Each interrupt represents the time periods, T1, T2, T3, T4, as discussed above. If the four interrupts are triggered, the reflection information, i.e. the signal 64, is decoded as described above and the ratio is calculated in block 142. The program determines if the new reflection is a valid reflection in decision block 143.

The program determines if the reflection is valid by evaluating the measured widths of the sections 58*a*, 58*b*, and 58*c* as defined by the duration of the time in which the laser beam 12 sweeps across the sections 58*a*, 58*b*, and 58*c*. As the actual widths of the sections 58*a*, 58*b* and 58*c* are known or predetermined, mathematical relationships between the actual widths, i.e. ratios or differences, are also known. Accordingly, the same mathematical relationships between the measured widths may be used to determine if the reflection is valid. Specifically, the new reflection is valid if the ratio is less than 0.5 or another predetermined value if the widths of the sections 58*a*, 58*b*, 58*c* are not equal. The reflection is also valid if the duration of the first portion equals the duration of the third portion or another predetermined value if the width of the first section 58*a* does not equal the width of the third section 58*c*. The reflection is also valid if the duration of the first, second and third portion divided by the duration of the first portion equals approximately three or another predetermined value if the widths of the sections 58*a*, 58*b*, 58*c* are not equal. It will be appreciated by those skilled in the art that other ratios or mathematical relationships may be used to determine if the reflection is valid. If the reflection is valid, a reset counter is set to zero in block 144. The reset counter is used to keep track how long the target 58 has not been sighted. In the illustrated embodiment, the reset flag will be asserted if the target 58 is not sighted for over two seconds. The reflection information is next categorized in block 150.

Figure 11:
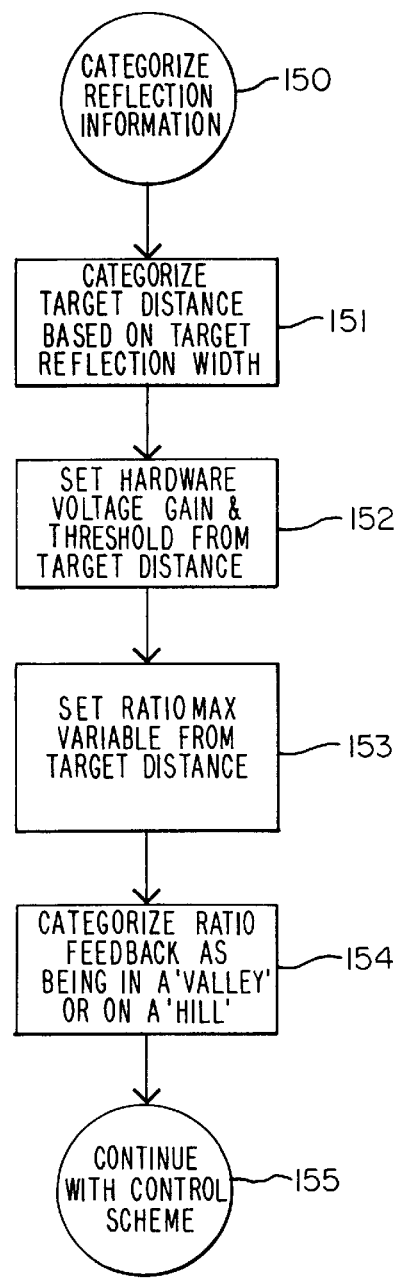

The categorization subroutine 150 is shown in FIG. 11. In block 151, the target distance is categorized based on the total width of the target 58, i.e. the total duration of the three time periods as discussed above. The estimated target distance is extracted from the data table. Once the target distance has been estimated, the voltage gain and voltage threshold is extracted from the data table in block 152. In block 153, the RatioMax variable is extracted from the data table. The RatioMax variable is the predetermined value which is compared to the ratio to determine if the laser beam 12 is focused. In block 154, the ratio is categorized as being in a "valley" region or on a "hill" region.

Figure 14:
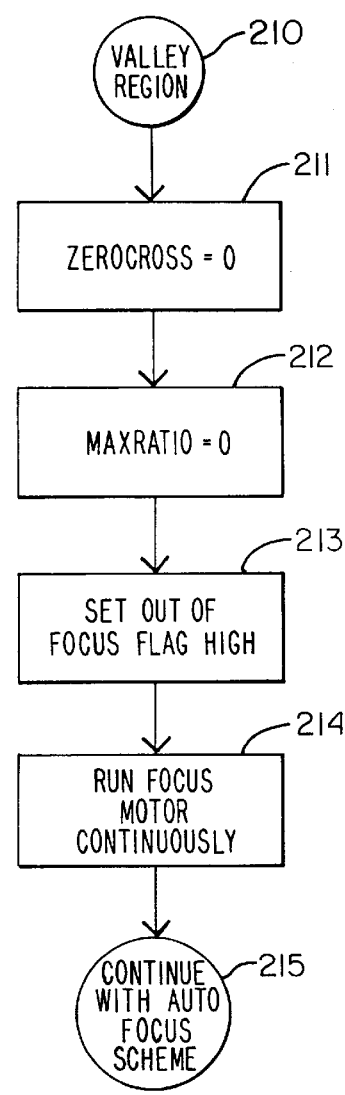
Figure 15:
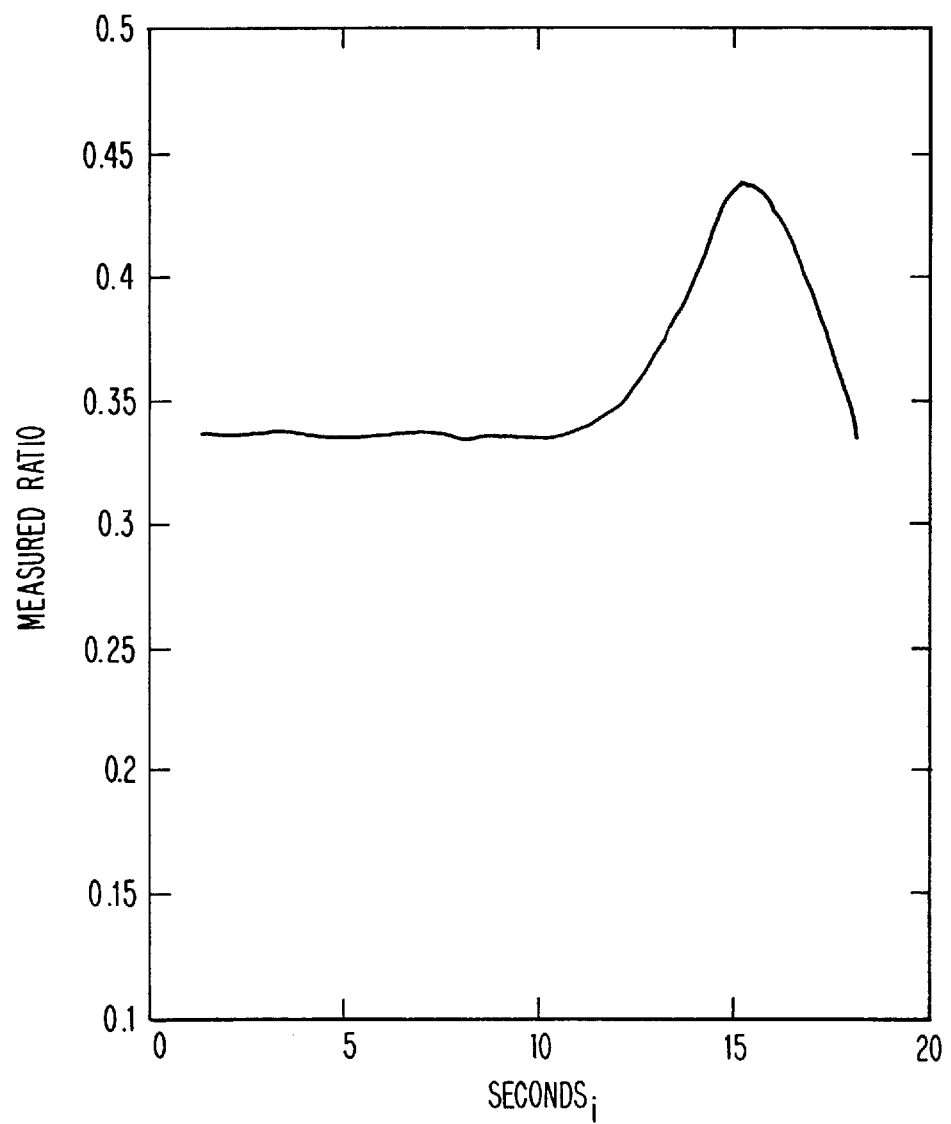
FIG. 15 is a sample graph of a ratio over time derived from the autofocusing routine of FIGS. 7–14.

The "valley" region and the "hill" region is best described with reference to FIG. 15. FIG. 15 is a representation of ratio over time. The generally flat area is considered the "valley" region while the sloping area is considered the "hill" region. It should be apparent that the laser beam 12 is focused at the summit or peak of the graph. The laser beam 12 is far from focus in the "valley" region and near focus on the "hill" region. The data table includes a variable based on the estimated target distance. The variable is used to determine the region in which the ratio is located. For example, as shown in FIG. 14, the ratio is in the "valley" region for all ratio values less than 0.35. A ratio greater than 0.35 approaches the upper slope of the "hill" region. The RatioMax will be set at a particular value less than 0.45. Based on this particular estimated distance, the data table may include 0.35 as the variable for the "valley" and "hill" determination. In addition, the data table may include appropriate variables for the gain voltage, the threshold voltage and the RatioMax. The program then returns to the run autofocus subroutine 140 in block 155.

The program now determines if the reset flag has been asserted in decision block 156. As stated above, the reset flag is asserted during the initialize autofocus subroutine 110 or when the target 58 moves or disappears. If the reset flag is asserted, the program executes the system reset subroutine 170. If the reset flag is not asserted, the program makes a decision in block 157 based on whether the ratio is in the "hill" region. If the ratio is in the "hill" region, the program executes the hill subroutine 190. If the ratio is not in the "hill" region, the program executes the valley subroutine 210.

Figure 12:
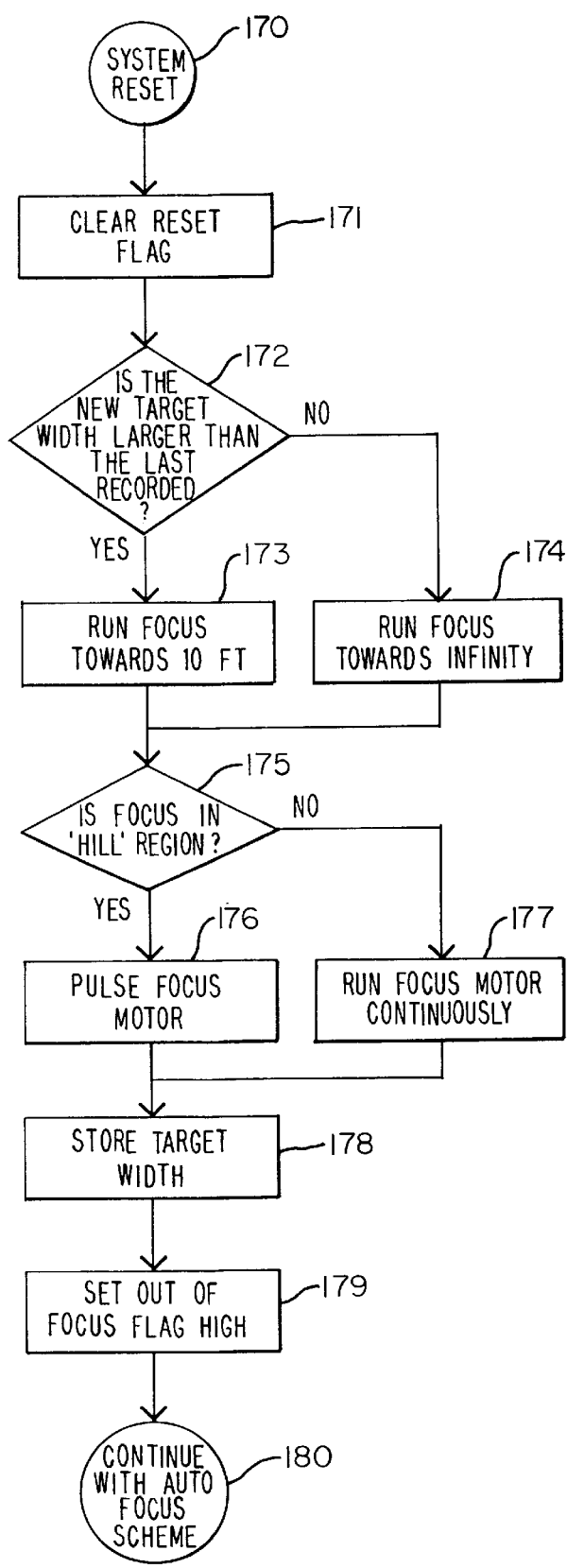

The system reset subroutine 170 is shown in FIG. 12. The first block of the subroutine clears the reset flag in block 171. The program determines if the new target width is larger than the last target width recorded. If the target width is larger, then in block 173, the focus motor 43 runs towards the minimum focus—10 feet in the illustrated embodiment. If the target width is not larger, then in block 174, the focus motor 43 runs towards the maximum focus—300 feet in the illustrated embodiment. The focus motor 43 will be run towards the minimum focus after the first measurement is taken since the last recorded total duration is set to zero during initialization. The autofocusing routine is designed to run from maximum focus to minimum focus at the initial stage. It should be appreciated by those skilled in the art that the minimum and maximum focus distances may be set to any reasonable value. Next, the program makes a decision in block 175 based on whether the ratio is on the "hill" region. If the ratio is on the "hill" region, the focus motor 43 is pulsed in block 176. Since the laser beam 12 is near focus, the focus motor 43 is pulsed to move the focusing lens slightly. If the ratio is in the "valley" region, the focus motor 43 is run continuously in block 177. Since the laser beam 12 is far from focus, continuous operation of the focus motor 43 while in the "valley" region will also decrease the total time required to focus the laser beam 12. It should be apparent that the system reset subroutine 170 is also executed if the target 58 has moved or disappeared. The system reset subroutine 170 is executed if the target moves or disappears so that the entire autofocusing routine does not have to be reset. For example, if the laser beam 12 is near focus and the target 58 is moved slightly, the laser beam 12 may be quickly focused by determining the direction to operate the focus motor 43 and by pulsing the motor instead of running it continuously. Next, the program stores the new target width in memory in block 178 so that the new target width becomes the last recorded target width for future comparison. In block 179, the out of focus flag is set high. Setting the out of focus flag high informs the program that the laser beam 12 has not been focused yet. The program is returned to the run autofocus subroutine in block 180.

Figure 13:
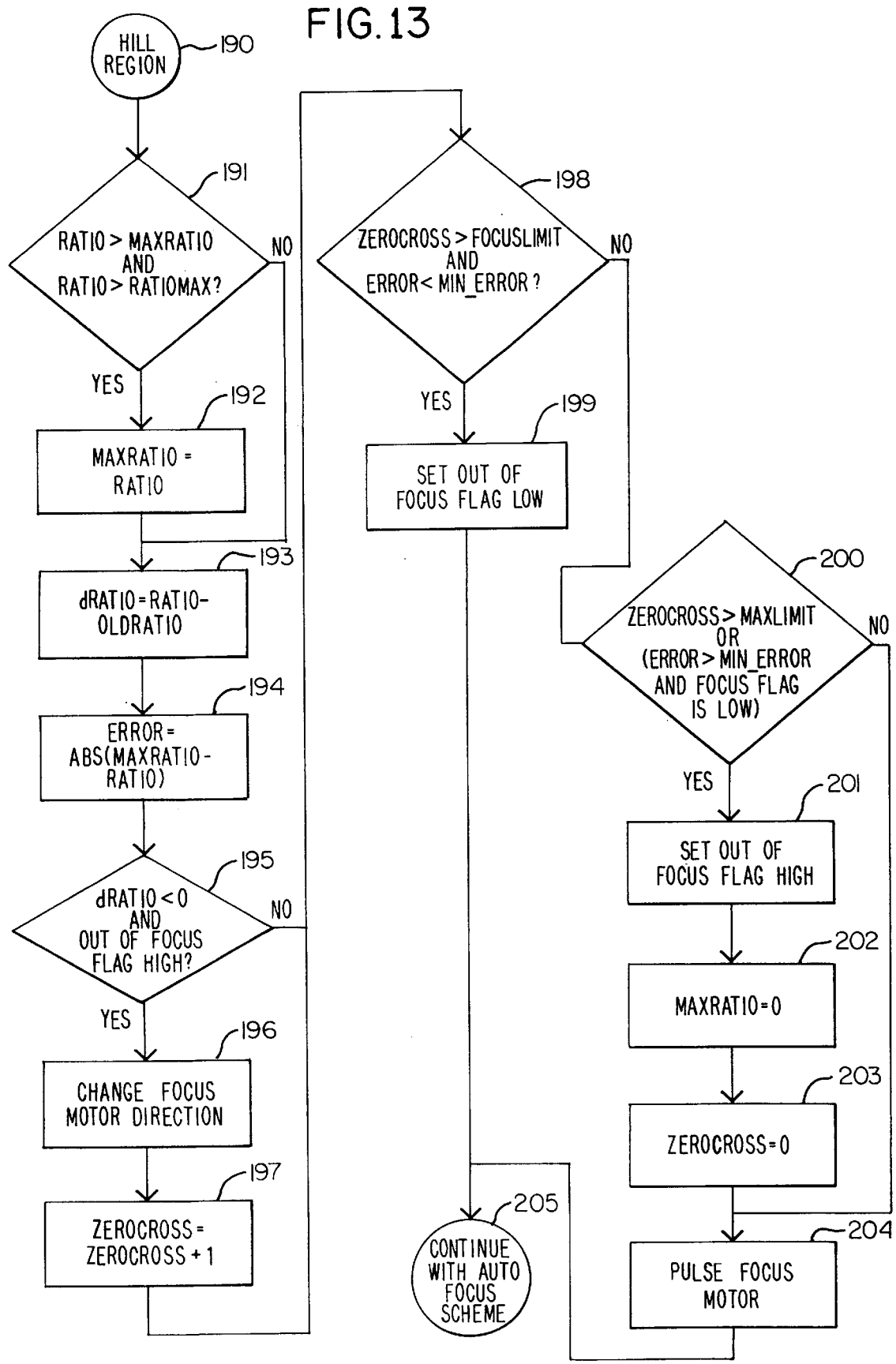

The hill region subroutine 190 is shown in FIG. 13. The program determines if the ratio is greater than the MaxRatio and the RatioMax in decision block 191. MaxRatio is the largest ratio measured during the autofocusing routine. If the ratio is greater than MaxRatio and RatioMax, the laser beam 12 may be in focus. If the ratio is greater than MaxRatio and RatioMax, MaxRatio is set to ratio in block 192. The derivative of the ratio is determined in block 193 by subtracting the old ratio from the new ratio. Block 193 is executed after block 192 or if the ratio is not greater than MaxRatio and RatioMax. If the derivative is positive, the ratio is on the upslope of the "hill" while if the derivative is negative, the ratio is on the downslope of the "hill."

The error is calculated in block 194 by taking the absolute value of the difference between the MaxRatio and the ratio. The error is used to determine how close the laser beam 12 is to the desired focus. The program determines in block 195 whether the derivative is negative and if the out of focus flag is high. If the answer is yes, then the laser beam 12 is not focused yet and the ratio is over the peak and on the downslope of the "hill." In block 196, the focus motor 43 is reversed so that the ratio approaches the peak. In block 197, a one is added to the zerocross variable.

The program goes to decision block 198 after block 197 or if the derivative is not negative and if the out of focus flag is not high. In decision block 198, the program determines if zerocross is greater than the FocusLimit and if the error is less than the MinimumError. The FocusLimit and MinimumError are variables set by the program.

The laser beam 12 is focused by achieving the maximum ratio. The first baseline for achieving focus is that the ratio must exceed RatioMax. The program goal is to adjust the focusing lens until the maximum ratio for perfect to near perfect focus is achieved. However, the program does not know the maximum ratio for any given distance. RatioMax is only an estimate based on the estimated target distance from the target width. The autofocusing routine is designed to bracket the maximum ratio for perfect to near perfect focusing. The MinimumError variable and the FocusLimit variable are set to achieve perfect to near perfect focusing within a reasonable period of time. The error calculation and comparison with the MinimumError helps ensure that the maximum ratio is being bracketed. Requiring the error to be within a certain range keeps the ratio at or near the maximum ratio.

The zerocross variable informs the program the number of times in which the ratio has switched between the upslope and downslope of the hill. Bracketing the maximum ratio in this manner increases the likelihood that the absolute maximum ratio for perfect to near perfect focusing will be achieved. If the zerocross is greater than the FocusLimit and the error is less than the MinimumError, then the out of focus flag is set low in block 199. The laser beam is now focused for the particular target location. It should be noted that the autofocusing routine continues to run until the user deactivates autofocusing. The autofocusing routine will continue running but further adjustments to the focus motor 43 will not be made unless the target 58 has moved.

If zerocross is not greater than the FocusLimit and the error is not less than the MinimumError then the program determines if the zerocross is greater than the MaximumLimit in block 200, or if the error is greater than the MinimumError and the focus flag is low. The MaximumLimit is a variable which is used to determine if the MaxRatio is set too high because of an erroneous reflection. A reflection may be detected which appears to be valid. The ratio from such a detection may be higher than the maximum ratio for the particular target distance. If zerocross is greater than the MaximumLimit, then MaxRatio is too high such that the laser beam 12 cannot be focused.

The other determination is made to determine if the laser beam 12 has been previously focused and the target 58 has been moved or misaligned. The laser beam 12 was previously focused since the out of focus flag is low. The error may be greater than the MinimumError such that the laser beam 12 will not be able to be focused. The decision block 200 is used to reset the MaxRatio, zerocross variable and set the out of focus flag high in order to force the autofocusing routine to start over and refocus. The program sets the out of focus flag high in block 201. In block 202, the MaxRatio is set to zero and in block 203 the zerocross is set to zero. The program pulses the focus motor 43 in block 204 if the either scenario from block 200 is not true or after block 203 is executed. The program returns to the run autofocus subroutine 140 in block 205 after blocks 199 or 204 are executed.

The valley subroutine 210 is shown in FIG. 14. Zerocross is set to zero in block 211. MaxRatio is set to zero in block 212. The out of focus flag is set high in block 213. The focus motor 43 is run continuously in block 214. The program is returned to the run autofocus subroutine 140 in block 215. The program does not know which direction to run the focus motor 43 when the ratio is in the valley region. The focus motor 43 continues to run in the current direction since there is an equal chance that the focus motor 43 is adjusting the focusing lens 40 towards the "hill" region. Consequently, the focus motor 43 will run continuously until the ratio enters the "hill" region or until the focus motor 43 attempts to drive the focusing mechanism 30 past its upper and lower focusing limits.

After the system reset subroutine 170, the hill region subroutine 190, or the valley region subroutine 210 have been executed, the program returns to the run autofocus routine 140 in FIG. 10. In block 219, the ratio value is stored in memory. The ratio value is stored so that it may be used in the hill region subroutine to calculate the derivative. Back to block 141, if a new reflection has not occurred, the program determines if the reset flag has been cleared in block 220. The program executes decision block 221 after block 219 or if the reset flag has been cleared. The program determines in block 221 whether a current limit has been detected from the focus motor 43. The focus motor 43 will generate a current limit signal if the motor tries to run the focusing mechanism 30 past its upper and lower limits. If a current limit signal is detected, the program increments the current limit counter in block 222. The program determines in block 223 whether the current limit counter is greater than an acceptable limit. A current limit signal is briefly seen when the focus motor 43 changes direction such that the current limit signal must be present for a set period of time before action is taken. If the current limit counter is greater than the acceptable limit then the direction of the focus motor 43 is changed in block 224. The focus motor 43 is then turned off in block 225.

The reset counter is incremented by one after block 225 or if a current limit signal has not been detected or if the counter is not above the acceptable limit. The program next determines if the reset counter is above an acceptable limit. If the reset counter is above the acceptable limit, the reset autofocus subroutine 120 is executed from block 228. The program returns to the main program 110 from block 229 after the reset autofocus subroutine 120 is executed or if the reset counter is not above the acceptable limit or if the reset flag has not been cleared. The autofocusing routine continues to run until the autofocus mode is deactivated.

It should be apparent that the disclosed autofocusing routine may be used with other laser transmitters. The autofocusing routine is only required to receive a signal from the target 58 and be adapted to adjust a focus motor 43 and focusing lens based on the signal. The illustrated embodiment is digitally based. However, it will be appreciated by those skilled in the art that an analog based system with asynchronous components may be used without departing from the scope of the present invention.

Having described the invention in detail and by reference to preferred embodiments thereof, it will be apparent that modifications and variations are possible without departing from the scope of the invention which is defined in the appended claims.

What is claimed is:

1. A process for autofocusing a rotating laser beam having a spot size, said process comprising the steps of:
    projecting said laser beam from a laser source such that it sweeps across a target, said target having a plurality of reflective sections and at least one non-reflective section;
    detecting a reflected laser beam from said target and generating a signal having a waveform representative of said reflected laser beam, said waveform including a set of portions having durations corresponding to time periods when said laser beam traverses said plurality of reflective sections and said at least one non-reflective section;
    adjusting said spot size of said laser beam in response to said time periods.

2. The process of claim 1, wherein said plurality of reflective sections includes a first reflective section and a second reflective section with said at least one non-reflective section positioned therebetween.

3. The process of claim 1, wherein said target comprises a plurality of non-reflective sections with respective ones of said plurality of non-reflective sections alternating in position with respective ones of said plurality of reflective sections.

4. The process of claim 1, wherein said laser beam is focused when a sum of said durations corresponding to said time periods when said laser beam traverses said plurality of reflective sections is less than a predetermined value.

5. The process of claim 1, wherein said laser beam is focused when said duration corresponding to said time period when said laser beam traverses said at least one non-reflective section is greater than a predetermined value.

6. The process of claim 1, wherein said laser beam is focused when a ratio of said duration corresponding to said time period when said laser beam traverses said at least one non-reflective section to a sum of said durations corresponding to said time periods when said laser beam traverses said plurality of reflective sections is greater than a predetermined value.

7. The process of claim 6, further comprising the step of determining a distance between said laser source and said target.

8. The process of claim 7, wherein said predetermined value corresponds to an approximate maximum of said ratio at said distance.

9. The process of claim 1, further comprising the step of amplitude modulating said laser beam.

10. The process of claim 1, further comprising the step of dithering said laser beam across said target.

11. The process of claim 1, wherein each section of said plurality of reflective sections and said at least one non-reflective section have equal widths.

12. The process of claim 1, further comprising the step of determining if said reflected laser beam is a valid reflection.

13. The process of claim 12, wherein the step of determining if said reflected laser beam is a valid reflection comprises the steps of:
    measuring a width for each of at least two of said sections of said target based on said signal;
    calculating a measured ratio based on said measured widths; and
    determining if said measured ratio corresponds to an actual ratio based on actual widths of said sections of said target.

14. The process of claim 1, further comprising the step of determining if said target has moved.

15. The process of claim 4, further comprising the step of adjusting said predetermined value so that said sum of said durations corresponding to said time periods when said laser beam traverses said plurality of reflective sections is minimized.

16. The process of claim 5, further comprising the step of adjusting said predetermined value so that said duration corresponding to said time period when said laser beam traverses said at least one non-reflective section is maximized.

17. The process of claim 6, further comprising the step of adjusting said predetermined value so that said ratio is maximized.

18. The process of claim 1, wherein said target comprises a single integral unit.

19. The process of claim 1, further comprising the step of establishing predetermined gain and threshold values for detecting said reflected laser beam.

20. The process of claim 19, further comprising the step of adjusting at least one of said gain or threshold values if said target has not been detected for a predetermined period of time.

21. An autofocusing system for focusing a rotating laser beam from a laser source, said system comprising:
    a target having a plurality of reflective sections and at least one non-reflective section, said laser beam being swept across said target and forming a reflected laser beam;
    a focusing lens positioned between said laser source and said target and adapted to control a spot size of said laser beam on said target;
    a photodetecting system generating a signal having a waveform representative of said reflected laser beam, said waveform including a set of portions having durations corresponding to time periods when said laser beam traverses said plurality of reflective sections and said at least one non-reflective section;
    a processor adapted to receive said signal and programmed to control said focusing lens based on said time periods.

22. The system of claim 21, wherein said plurality of reflective sections includes a first reflective section and a second reflective section with said at least one non-reflective section positioned therebetween.

23. The system of claim 21, wherein said target comprises a plurality of non-reflective sections with respective ones of said plurality of non-reflective sections alternating in position with respective ones of said plurality of reflective sections.

24. The system of claim 21, wherein said laser beam is focused when a sum of said durations corresponding to said time periods when laser beam traverses said plurality of reflective sections is less than a predetermined value.

25. The system of claim 21, wherein said laser beam is focused when said duration corresponding to said time period when said laser beam traverses said at least one non-reflective section is greater than a predetermined value.

26. The system of claim 21, wherein said laser beam is focused when a ratio of said duration corresponding to said time period when said laser beam traverses said at least one non-reflective section to a sum of said durations corresponding to said time periods when laser beam traverses said plurality of reflective sections is greater than a predetermined value.

27. The system of claim 26, wherein said processor is further programmed to calculate a distance between said laser source and said target.

28. The system of claim 27, wherein said processor is further programmed to set said predetermined value corresponding to an approximate maximum of said ratio at said distance.

29. The system of claim 21, wherein said laser beam is amplitude modulated.

30. The system of claim 21, wherein said laser beam is dithered across said target.

31. The system of claim 21, wherein each section of said plurality of reflective sections and said at least one non-reflective section have equal widths.

32. The system of claim 21, wherein said processor is further programmed to determine if said reflected laser beam is a valid reflection.

33. The system of claim 32, wherein said processor is programmed to:

determine a measured width for each of at least two of said sections of said target based on said signal, calculate a measured ratio based on said measured widths; and determine if said measured ratio corresponds to an actual ratio based on actual widths of said sections of said target, so as to validate reflected laser beam.

34. The system of claim 21, wherein said processor is further programmed to determine if said target has moved.

35. The system of claim 24, wherein said processor is further programmed to adjust said predetermined value so that said sum of durations corresponding to said time periods when said laser beam traverses said plurality of reflective sections is minimized.

36. The system of claim 25, wherein said processor is further programmed to adjust said predetermined value so that said duration corresponding to said time period when said laser beam traverses said at least one non-reflective section is maximized.

37. The system of claim 26, wherein said processor is further programmed to adjust said predetermined value so that said ratio is maximized.

38. The system of claim 21, wherein said target comprises a single integral unit.

39. The system of claim 21, wherein said processor is further programmed to establish predetermined gain and threshold values for detecting said reflected laser beam.

40. The system of claim 39, wherein said processor is further programmed to adjust at least one of said gain or threshold values if said target has not been detected for a predetermined period of time.

41. A laser transmitter comprising:

a light source generating laser light;

an optical projecting device positioned to receive said laser light from said light source, said optical projecting device including a rotating reflector to project said laser light along a plane;

a focusing lens adapted to control a spot size of said laser beam on said target;

a photodetecting system receiving a reflected laser beam and generating a signal having a waveform representative of said reflected laser beam, said waveform including a set of portions having durations corresponding to time periods when said laser beam traverses reflective sections and at least one non-reflective section of a target; and a processor adapted to receive said signal and programmed to control said focusing lens based on said time periods.

42. The laser transmitter of claim 41, wherein said laser beam is focused when a sum of said durations corresponding to said time periods when said laser beam traverses said plurality of reflective sections is less than a predetermined value.

43. The laser transmitter of claim 41, wherein said laser beam is focused when said duration corresponding to said time period when said laser beam traverses said at least one non-reflective is greater than a predetermined value.

44. The laser transmitter of claim 41, wherein said laser beam is focused when a ratio of said duration corresponding to said time period when said laser beam traverses said at least one non-reflective to a sum of said durations corresponding to said time periods when said laser beam traverses said plurality of reflective sections is greater than a predetermined value.

45. The laser transmitter of claim 41, wherein said laser beam is amplitude modulated.

46. The laser transmitter of claim 41, wherein said laser beam is dithered.

47. The laser transmitter of claim 41, wherein said processor is further programmed to determine if said reflected laser beam is a valid reflection.

48. The laser transmitter of claim 41, wherein said processor is further programmed to establish predetermined gain and threshold values for detecting said reflected laser beam.

* * * * *